(12) United States Patent
Kaji

(10) Patent No.: US 8,700,511 B2
(45) Date of Patent: Apr. 15, 2014

(54) CONTROL DEVICE, CHARGE STORAGE SYSTEM, CONTROL METHOD, AND COMPUTER PROGRAM

(75) Inventor: Mitsuru Kaji, Osaka (JP)

(73) Assignee: Panasonic Corporation, Osaka (JP)

( * ) Notice: Subject to any disclaimer, the term of this patent is extended or adjusted under 35 U.S.C. 154(b) by 102 days.

(21) Appl. No.: 13/390,698

(22) PCT Filed: May 9, 2011

(86) PCT No.: PCT/JP2011/002575
§ 371 (c)(1),
(2), (4) Date: Feb. 16, 2012

(87) PCT Pub. No.: WO2011/142114
PCT Pub. Date: Nov. 17, 2011

(65) Prior Publication Data
US 2012/0150709 A1    Jun. 14, 2012

(30) Foreign Application Priority Data

May 10, 2010  (JP) .................................. 2010-108763

(51) Int. Cl.
*G06Q 40/00*    (2012.01)
(52) U.S. Cl.
USPC ......................................... 705/35; 705/36 R
(58) Field of Classification Search
USPC .................................................... 705/35–40
See application file for complete search history.

(56) References Cited

U.S. PATENT DOCUMENTS

| | | | |
|---|---|---|---|
| 5,367,627 A * | 11/1994 | Johnson .......................... | 715/708 |
| 5,834,922 A | 11/1998 | Ikawa et al. | |
| 6,034,507 A | 3/2000 | Ikawa et al. | |
| RE37,678 E | 4/2002 | Ikawa et al. | |
| RE39,749 E | 7/2007 | Ikawa et al. | |
| RE39,908 E | 11/2007 | Ikawa et al. | |
| 8,497,686 B2 * | 7/2013 | Hoshino ......................... | 324/435 |
| 2010/0270974 A1 | 10/2010 | Sakakibara | |

FOREIGN PATENT DOCUMENTS

| | | |
|---|---|---|
| JP | 7-192769 | 7/1995 |
| JP | 2979939 | 11/1999 |
| JP | 2000-324699 | 11/2000 |
| JP | 2003-244841 | 8/2003 |
| JP | 2004-194436 | 7/2004 |
| JP | 2005-143218 | 6/2005 |
| JP | 2006-050763 | 2/2006 |
| JP | 2007-215262 | 8/2007 |
| JP | 4064334 | 3/2008 |
| JP | 2010-259163 | 11/2010 |

OTHER PUBLICATIONS

International Search Report issued Aug. 2, 2011 in International (PCT) Application No. PCT/JP2011/002575.

* cited by examiner

*Primary Examiner* — Thu Thao Havan
(74) *Attorney, Agent, or Firm* — Wenderoth, Lind & Ponack, L.L.P.

(57) ABSTRACT

In an electric power storage system connected to a commercial power system, a controller includes a deterioration price holding unit that holds discharge costs in association with depths of discharge of a storage battery, a price information obtaining unit that obtains a price of electricity, and a depth-of-discharge switching unit that discharges the storage battery at a depth of discharge at which the discharge cost held in association with the depth of discharge does not exceed a difference in the price, so as to properly determine the depth of charge and discharge in consideration of life properties of the battery and the difference in the price in the dynamically changing price of electricity.

13 Claims, 9 Drawing Sheets

CONTROL DEVICE, CHARGE STORAGE SYSTEM, CONTROL METHOD, AND COMPUTER PROGRAM

TECHNICAL FIELD

The present invention relates to an electric power storage system for commercial power.

BACKGROUND ART

Use of storage batteries for storage of commercial power has been examined along with progress of the battery techniques accompanied by widespread use of notebook computers and portable information apparatuses in these days. For example, Patent Document 1 discloses a configuration of an electric power storage system for commercial power using a battery module in which a plurality of compact storage batteries are connected in parallel and in series.

Recently, as application of these electric power storage systems for commercial power, smoothing of electric power generated by wind power generation and solar power generation has received attention. Moreover, it has been examined that the electric power is charged during the night when an electricity price is low, and discharged during the daytime when the electricity price is high, thereby to reduce an electricity cost for a user. Patent Document 2 discloses a configuration of an electric power storage system for commercial power in which electric power is stored during the nighttime price hours, and discharged during the daytime price hours.

In the electric power storage system using the storage battery, management of a depth of discharge is essential. This is because the storage battery is deteriorated due to overdischarge. Patent Document 2 above discloses a configuration in which a remaining capacity is estimated from the history of charge and discharge, and discharge is performed at 80% to 95% of the remaining capacity as an upper limit. Moreover, in the case of the lithium ion storage battery, it is known that by making the depth of discharge shallow, the life of the battery (lifetime capacity) is prolonged. Patent Document 3 discloses a configuration in which nighttime electricity is stored, and discharged during the daytime as in Patent Document 2, but a battery is usually used at a shallow depth of discharge. Moreover, as a related art in consideration of the cycle life of the storage battery, Patent Document 4 is disclosed.

Moreover, recently, along with liberalization of the electricity market, real time pricing in which the price of electricity dynamically changes is started to be introduced. Patent Document 5 discloses a configuration of an electric power storage system ready for not only the case where the price of electricity is fixed depending on the hours such as the nighttime and the daytime, but also the case where the price of electricity dynamically changes. In the configuration in Patent Document 5, charge is performed at a time of the day in which the electricity price is lowest, and discharge is performed at a time of the day in which the electricity price is highest even in the case of the dynamic price of electricity.

CITATION LIST

Patent Literature

[PTL 1] Japanese Unexamined Patent Application Publication No. 2006-50763
[PTL 2] Japanese Patent No. 2979939
[PTL 3] Japanese Unexamined Patent Application Publication No. 2007-215262
[PTL 4] Japanese Patent No. 4064334
[PTL 5] Japanese Unexamined Patent Application Publication No. 2004-194436

SUMMARY OF INVENTION

Technical Problem

In the case where the price of electricity dynamically changes, desirably, so as to prolong the life of the battery, the depth of discharge is shallow if the difference between the price of electricity at charge and that at discharge is small, and the depth of discharge is deep if the difference in the price is large. If the difference in the price is greater than a predetermined value, economic merits can be increased by increasing the amount of charge and discharge, in spite of considering replacement cost of the battery module accompanied by deterioration.

In the configuration in Patent Document 5, however, in the case where the price of electricity dynamically changes, charge can be performed at a time when the electricity price is lowest, and discharge can be performed at a time when the electricity price is highest. On the other hand, a configuration in which the depth of charge and discharge is determined according to the difference in the price of electricity is not disclosed. Moreover, Patent Document 1 discloses optimization of an annual operation plan using the electricity price by time (season) or the like, but does not disclose a specific method for optimization. In Patent Documents 2 and 3, the maximum value of the depth of discharge is statically determined, or mainly determined by a pattern of demand. In Patent Document 4, while cost of the life of the battery is considered, in the case of the lead acid battery, the lifetime capacity (=cycle life×depth of discharge) does not depend on the depth of discharge but is fixed. Accordingly, the depth of discharge is not dynamically determined. Accordingly, in any of these documents, no method is disclosed in which the depth of discharge is determined according to the difference in the price of electricity that dynamically changes.

In order to solve the problems above, an object of the present invention is to provide determination of a proper depth of charge and discharge according to the price of electricity that dynamically changes while the life of the battery is considered.

Solution to Problem

In order to solve the problems above, a controller according to the present invention is a controller including: a holding unit configured to hold discharge costs at depths of discharge in association with the depths of discharge at which a storage battery is charged and discharged; an obtaining unit configured to obtain a price of electricity at discharge and a price of electricity at charge; and a discharge control unit configured to cause the storage battery to discharge at a depth of discharge at which the discharge cost held in association with the depth of discharge does not exceed a difference in in the price between the obtained price at discharge and the obtained price at charge, the difference in the price being obtained by subtracting the obtained price at charge from the obtained price at discharge.

Advantageous Effects of Invention

According to the electric power storage system according to the present invention, a depth of charge and discharge is determined while the life properties of the battery and the difference in the dynamic price of electricity are considered. Thereby, economic merits of the electric power storage system can be maximized.

This can prevent the depth of discharge at which discharge is performed from being an improper depth of discharge at which the discharge cost exceeds the difference in the price between the price at charge and that at discharge, and can provide a proper depth of discharge at which the discharge cost does not exceeds the difference in the price.

DESCRIPTION OF EMBODIMENTS

Hereinafter, embodiments according to the present invention will be described with reference to the drawings.

Figure 2:
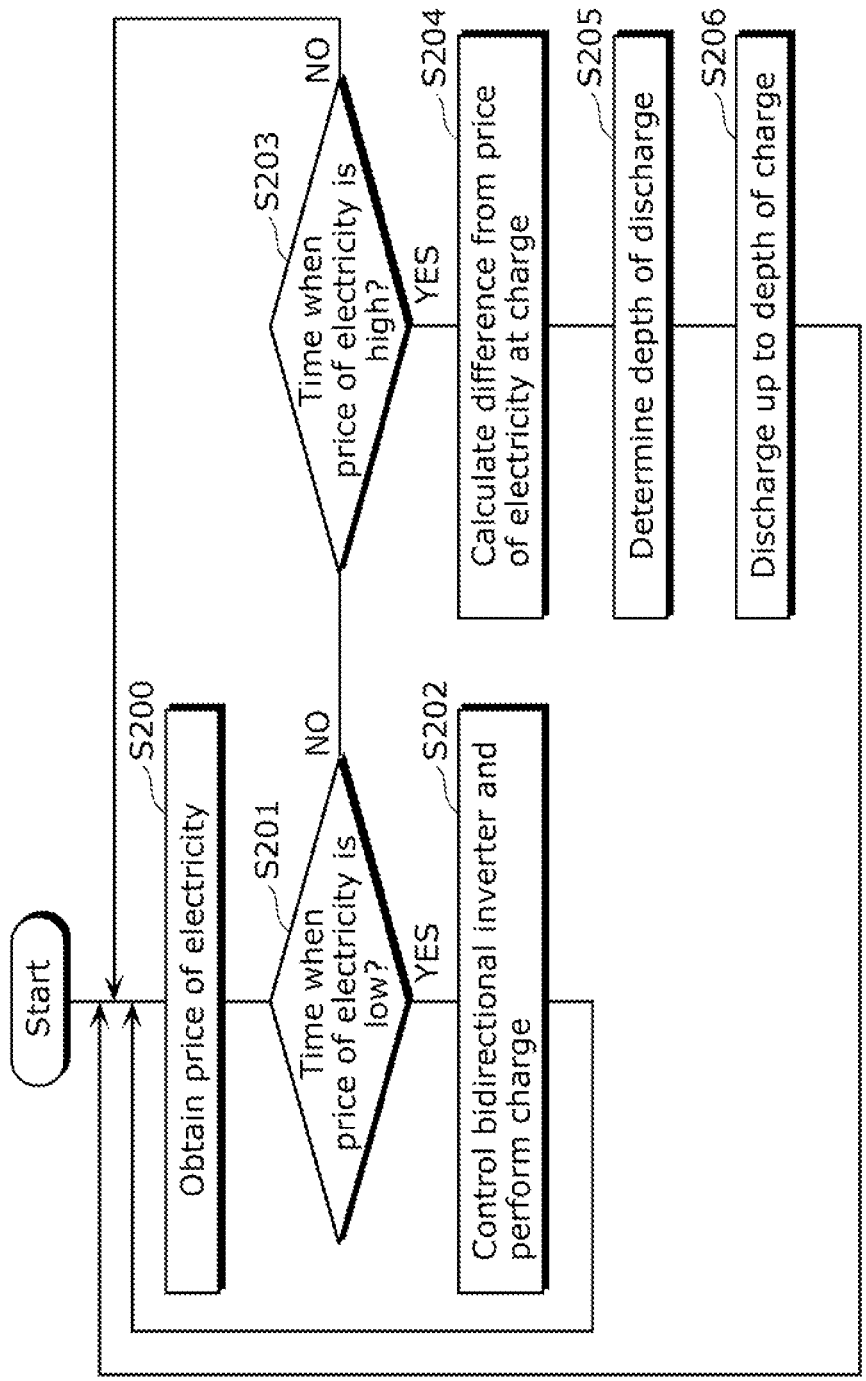
FIG. 2 is a schematic view showing processing of a controller according to Embodiment 1.
Figure 3:
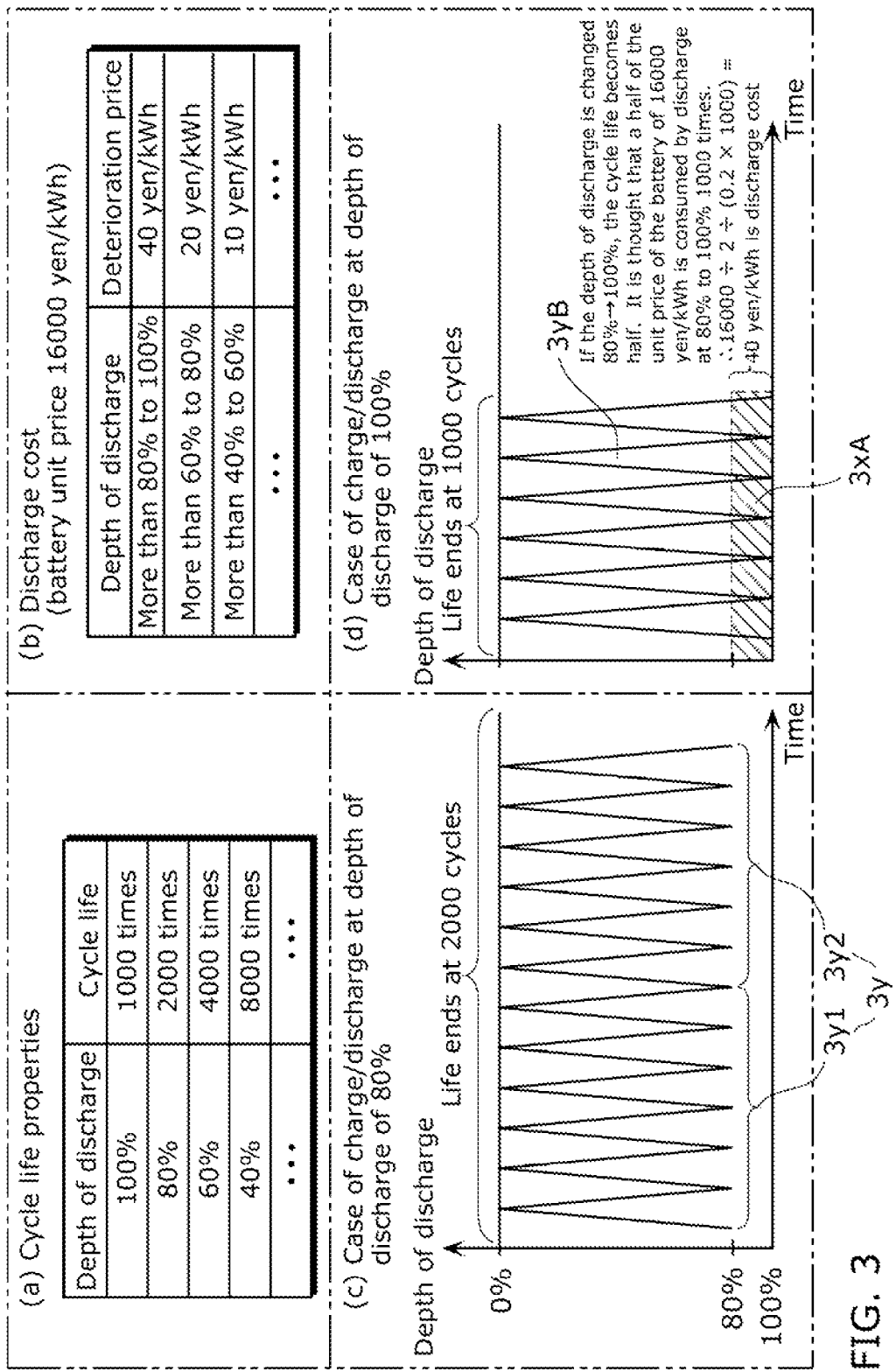
FIG. 3 is a drawing illustrating cycle life and discharge cost in Embodiment 1.
Figure 9:
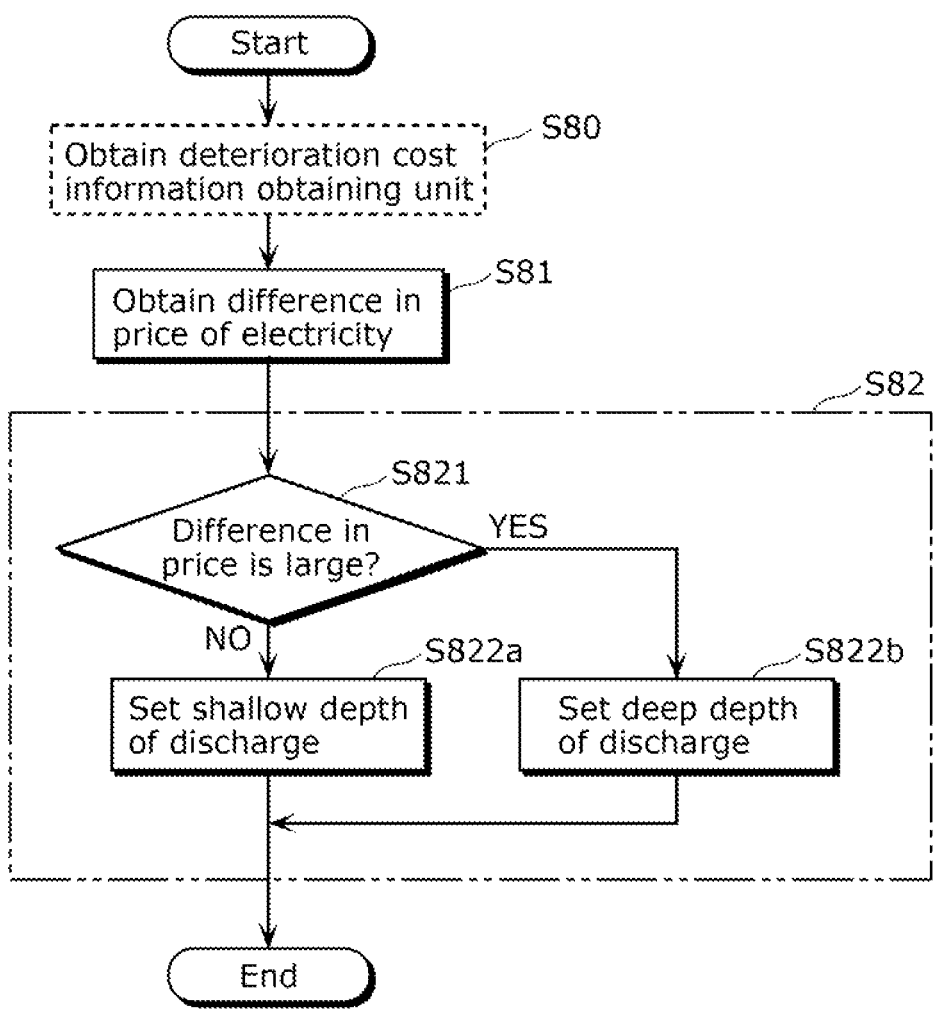
FIG. 9 is a flowchart of a controller.

A controller according to the embodiments is a controller (controller 14) including: a holding unit (deterioration price holding unit 14a, S80 in FIG. 9) that holds discharge costs at depths of discharge (10 yen/kWh, 20 yen/kWh, . . . ) in association with the depths of discharge (for example, a depth of discharge of more than 40% to 60% (for example, a depth of discharge of 50%), a depth of discharge of more than 60% to 80% (for example, depth of discharge of 70%), . . . in (b) of FIG. 3) at which a storage battery (storage battery 13) is charged and discharged; an obtaining unit (price information obtaining unit 14b, S81, S200 and S204 in FIG. 2) that obtains a price of electricity at discharge and a price of electricity at charge; and a discharge control unit (depth-of-discharge switching unit 14c, S82, S205, S206) that causes the storage battery to discharge at a depth of discharge (depth of discharge of more than 40% to 60% (for example, depth of discharge of 50%), depth of discharge of more than 60% to 80% (for example, depth of discharge of 70%), . . . ) in which the discharge cost held in association with the depth of discharge does not exceed a difference in the price between the obtained price at discharge and the obtained price at charge (for example, 10 yen/kWh, 20 yen/kWh, . . . ), the difference in the price being obtained by subtracting the obtained price at charge from the obtained price at discharge.

Discharge at a depth of discharge at which the discharge cost does not exceeds the difference in the price may be specifically discharge up to the amount of electric power to be stored not less than a minimum amount of electric power to be stored (amount of electric power to be stored of 20% (30%), . . . ) (not less than 20% (not less than 30%), . . . ) in the depth of discharge (for example, 80% (70%), . . . ), for example. Namely, specifically, the charge and discharge at a depth of discharge are charge and discharge in which only discharge up to the amount of electric power to be stored not less than the minimum amount of electric power to be stored in the depth of discharge is performed, for example.

For example, the obtaining unit may obtain the selling price of the electricity at discharge when the discharged electricity is sold back by reverse power flow (see Embodiments 3 and 4).

More specifically, based on the total amount of electric power to be discharged, the proportion of the amount of electric power to be sold and the proportion of the amount of electric power to be consumed by an electric power consuming apparatus (for example, an electric power consuming apparatus 51) may be determined. Moreover, a price may be obtained by multiplying the proportion of the electric power to be sold by the selling price, a price may be obtained by multiplying the proportion of the electric power consumed by the electric power consuming apparatus by a buying price of the electric power to be bought in a commercial power system 10 in which the amount of the electric power is reduced by that of the electric power to be supplied by discharge, and the sum of the obtained prices may be calculated. Moreover, a difference between the price of the calculated sum and the price at discharge may be calculated, and used.

The discharge cost to be held may be a discharge cost per unit amount of electric power (for example, 1 kWh in (b) of FIG. 3), and the price at charge and that at discharge obtained by the obtaining unit each may be a price per the unit amount of electric power.

The controller may include a receiving unit (receiving unit 14aR) that receives the discharge cost. The holding unit (deterioration price holding unit 14a) may hold the received discharge cost in association with the depth of discharge of the discharge cost (data in each line in the table in (b) of FIG. 3).

Moreover, the price at charge obtained by the obtaining unit may be a price when the discharged electric power is re-charged at a time after a time of the discharge.

Namely, as described in detail later, for example, a table of the price of electricity at a time in a future when charge will be performed may be obtained.

As described later, the discharge cost held by the holding unit (for example, 40 yen/kWh) may be the following cost, for example. Namely, it may be the cost calculated from the depth of discharge of the discharge cost (more than 80% to 100% (for example, 100%)), the cycle life properties of the storage battery (1000 times in (d) of FIG. 3), and the price of the storage battery (for example, 16000 yen/1 kWh shown in (d) of FIG. 3).

[Embodiment 1]

Figure 1:
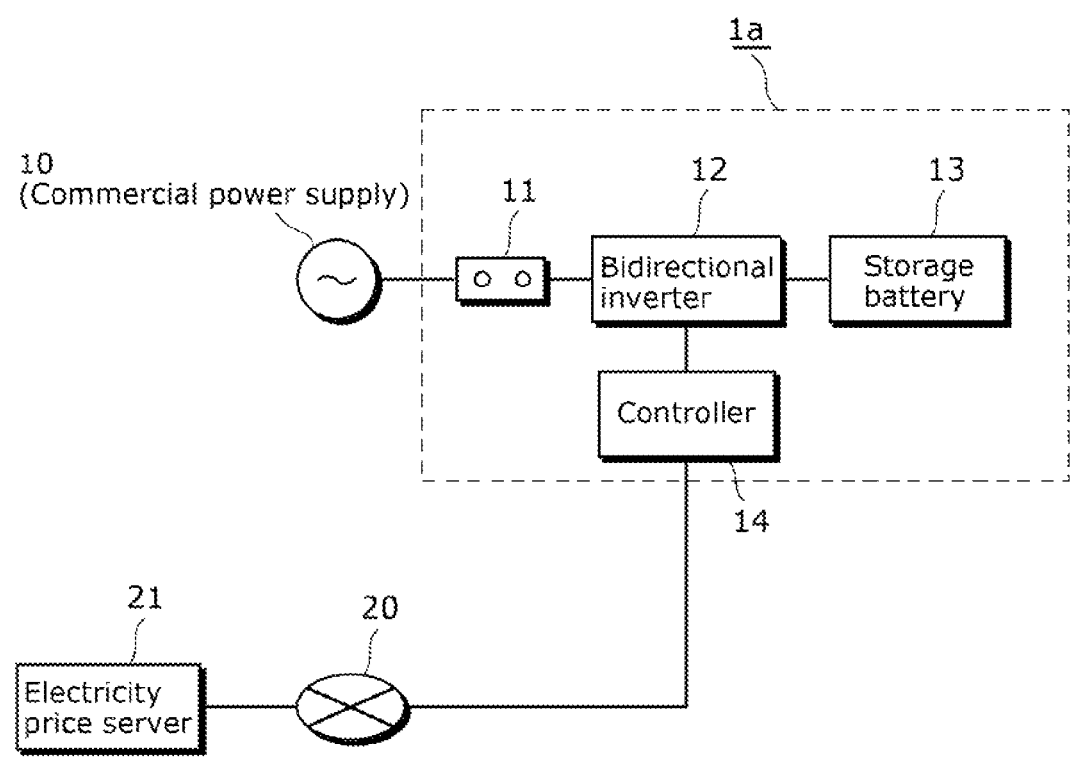
FIG. 1 is a schematic view of an electric power storage system according to Embodiments 1 and 2.

FIG. 1 is a block diagram of an electric power storage system 1a according to Embodiment 1.

The electric power storage system 1a includes a connection unit 11, a bidirectional inverter 12, a storage battery 13, and a controller 14.

The connection unit 11 is a connection terminal to the commercial power system 10, and accommodates a circuit breaker for protecting the commercial power system 10 and the bidirectional inverter 12 from an accident.

The bidirectional inverter 12 is connected to the commercial power system 10 via the connection unit 11, and bidirectionally converts the alternating current of the commercial power system 10 and the direct current of the storage battery 13. The direction and amount of electric power to be converted by the bidirectional inverter 12, i.e., the direction and amount of the storage battery 13 to be charged and discharged is instructed by the controller 14.

The storage battery 13 temporarily stores the electric power converted into DC by the bidirectional inverter 12, and discharges the stored electric power when necessary. The discharged electric power is returned to AC by the bidirectional inverter 12.

Desirably, the battery used for the storage battery 13 has a structure such that a deteriorated battery can be easily replaced in a module unit, for example. In the case where the battery module can be replaced, the battery module may include an IC chip that stores the life properties of the batteries within the module and a history of use. The information is extracted by the controller 14, and used.

The controller 14 determines the amount of electric power to be charged and discharged of the storage battery 13 at each time of a day in consideration of the dynamically changing electricity price and the life properties of the storage battery 13, and controls the bidirectional inverter 12. The controller 14 obtains the electricity price from an electricity price (price of electricity) server 21 of an electric power utility company connected via a communication system 20. The controller 14 may hold the life properties of the storage battery 13 in a fixed manner. Moreover, the controller 14 may obtain the life properties of the storage battery 13 from the IC chip mounted on the battery module described above.

The controller 14 (at least part thereof) may be a computer including a CPU (Central Processing Unit), a ROM (Read Only Memory), and a RAM (Random Access Memory), for example. By the computer, a computer program may be executed to implement the functions of the controller 14.

FIG. 2 is a schematic view showing a flow of the processing by the controller 14.

First, the controller 14 obtains the price of electricity at each time of a day from the electricity price server 21 (S200).

An alternative configuration may be provided in which the price of electricity broadcasted from the electricity price server 21 is received, instead of the controller 14 inquiring of the electricity price server 21. If it is known that the price of electricity periodically changes for a predetermined period of time, this step may be omitted for the predetermined period of time from the next time.

Next, from the table of the price of electricity obtained, the controller 14 determines whether the current time is the time when the price of electricity is lowest (S201).

If it is the time when the price of electricity is lowest (S201: YES), the controller 14 controls the bidirectional inverter 12, thereby to charge the storage battery 13.

On the other hand, if it is not the time when the price of electricity is lowest (S201: NO), the controller 14 determines whether it is the time when the price of electricity is highest (S203).

If the current time is the time when the price of electricity is highest (S203: YES), the controller 14 calculates the difference in the price between the price of electricity at the current time and that at charge (namely, the time when the price of electricity is lowest) (S204).

The price of electricity at the time when the price of electricity is lowest is suitably obtained from a table of the price of electricity in the future (the price of electricity to be charged next time in the case where discharge is performed), not from the table of the price of electricity in the past (the price when the electric power currently charged in the storage battery 13 is bought). This is because a desirable result about a timing and amount to sell a possessed item is usually obtained on the basis of a fall of the price in the future but not the price when the item was bought.

Next, the controller 14 determines the depth of discharge from the difference in the price of electricity calculated in Step S204 and the cycle life properties of the storage battery 13 (S205). The determination method will be described in detail below.

FIG. 3 is a drawing showing the discharge cost and the like of the storage battery 13.

The storage battery usually has the cycle life properties as shown in (a) of FIG. 3. In (a) of FIG. 3, it is shown that if charge and discharge (full charge and complete discharge, Region 3yB and Region 3xA) at a depth of discharge of 100% are repeated, the storage battery reaches the end of the life at the 1000th cycle ((d) of FIG. 3). The cycle life properties in (a) also shows that if charge and discharge at a depth of discharge of 80% (full charge and the remaining capacity of 20%) are repeated, the life is prolonged to 2000 cycles that is twice the life at a depth of discharge of 100% (Region 3y) ((c) of FIG. 3).

In the case of where charge and discharge at a depth of discharge of 80% are performed 1000 times (Region 3y1 and Region 3y2 in (c)), it may be thought that a half of the unit price of the battery is consumed. Accordingly, if charge and discharge at a depth of discharge of 100% are repeated 1000 times, it is thought that a half of the unit price of the battery is consumed by the charge and discharge at a depth of discharge up to 80% 1000 times (Region 3yB in (d)), and the other half of the unit price is consumed by the charge and discharge at a depth of discharge of 80% to 100% 1000 times (Region 3xA). Here, the price of the battery per 1 kWh is 16000 yen. The capacity at a depth of discharge of 80% to 100% (Region 3xA) is equivalent to 0.2 kWh. For this reason, it is thought that a cost (discharge cost, deterioration price, deterioration cost) of an amount obtained by dividing the other half (price in Region 3xA, 8000 yen/kWh) other than the half consumed in Region 3yB (8000 yen/kWh) "of the price of the battery per 1 kWh (16000 yen/kWh)" by {"capacity in Region 3xA (0.2 kWh)"×"1000 times (the number of times in Region 3xA)"}:

16000 yen÷2÷(0.2 kWh×1000 times)=40 yen/kWh is produced at discharge. The discharge cost of 40 yen/kWh may be determined as a discharge cost at a depth of discharge of more than 80% to 100% (for example, depth of discharge of 90%). In the same manner, a discharge cost at each depth of discharge is calculated. The result is 20 yen/kWh at more than 60% to 80% (for example, 70%), 10 yen/kWh at more than 40% to 60% (for example, 50%), and the like, as shown in (b). In Step S205, it is determined to perform discharge at a depth of charge in the range (at a depth of discharge of more than 40% to 60%) in which the discharge cost does not exceed the difference between the price of electricity at charge and that at discharge (for example, 10 yen/kWh). The depth of charge in which the discharge cost does not exceed the difference between the price of electricity at charge and that at discharge (10 yen/kWh) may be in the range of 0% to a specific depth of discharge more than 0% (60%), for example.

Next, the controller 14 controls the bidirectional inverter 12 to the determined depth of discharge, and discharge is performed (S206).

In such a configuration, the depth of discharge is properly set such that the integrated value of the values of the difference in the price of electricity at charge and that at discharge exceeds the price of the battery when the life of the battery reaches the end. Thus, the object of the present invention can be achieved.

Such calculation to determine the deterioration costs (deterioration price) at each of the depths of discharge (more than 80% to 100% (for example, 90%), more than 60% to 80% (for example, 70%), . . . ) may be performed by a designer of the controller in advance, for example. Additionally, the respective deterioration costs (40 yen/kWh, 20 yen/kWh, and the like) calculated by the designer in advance may be stored by the controller 14 or the like in association with the corresponding depths of discharge at which the deterioration costs are calculated (more than 80% to 100% (for example, 90%), more than 60% to 80% (for example, 70%), ... ). Specifically, the table in (b) of FIG. 3 may be stored, for example. The deterioration cost stored in association with the depth of discharge of the target to be processed may be read out, and used.

Alternatively, the calculation to determine the deterioration cost may be performed by the controller 14 or the like when the processing of the deterioration cost is performed.

Thus, the deterioration cost (deterioration price, discharge cost) is stored by the controller 14, and used. The deterioration cost used is greater as the depth of discharge corresponding to the deterioration cost is deeper. The deterioration cost used may be a deterioration cost determined by the method above, or may be a deterioration cost determined by other method.

[Embodiment 2]

In the electric power storage system 1a in FIG. 1, examine the case where the relationship between the depth of discharge x of the storage battery 13 ($0 \le x \le 1$) and the cycle life N is given by a function $N(x)$. In this case, if the current time is $t=0$ and a next cost function $TC(\cdot)$ is minimized, the amount of electric power to be charged and discharged of the storage battery 13 $\Delta s_t$ at each time t ($=0, 1, \ldots T-1$) can be determined.

[Math. 1]

$$TC(\Delta s_0, \Delta s_1, \ldots, \Delta s_{T-1}) = \sum_{t=0}^{T-1} \left\{ PC(\Delta s_t, t) + \frac{P}{C} \cdot \frac{N(1-s_t/C) - N(1-s_{t+1}/C)}{N(1-s_t/C)N(1-s_{t+1}/C)} \cdot u(-\Delta s_t) \right\} \quad (1)$$

Here, a function $PC(\Delta s_t, t)$ of the first term within the curly brackets in (1) designates the electricity price produced within a time step at the time t wherein the amount of electric power to be charged and discharged of the storage battery 13 at the time t is $\Delta s_t$. Here, if the price of electricity (unit price) at the time t obtained from the electricity price server 21 is expressed with $R(t)$, the function $PC(\Delta s_t, t)$ can be calculated by the following expression.

[Math. 2]

$$PC(\Delta s_t, t) = \begin{cases} R(t)\Delta s_t/(1-L_C) & (\Delta s_t \ge 0) \\ -R(t)\Delta s_t(1-L_D) & (\Delta s_t < 0) \end{cases} \quad (2)$$

A constant $L_C$ designates electric power loss produced at charge in the storage battery 13 and the bidirectional inverter 12, and a constant $L_D$ designates electric power loss produced at discharge. In the case where the charge loss and discharge loss can be neglected, the values of the constant $L_C$ and $L_D$ may be 0.

The length of the time T of the target to be processed from the time $t=0$ to the time $T-1$ may be a maximum length during which data from $R(0)$ to $R(T-1)$ can be obtained, for example. Namely, the length T may be a length three days away in the case where a price R at each time of a day is set three days away by the electric power utility company or the like and the price R four days later has not been set, for example.

The second term within the curly brackets in (1) designates the discharge cost calculated from the cycle life properties of the storage battery 13. The calculation described using FIG. 3 is represented by an expression. Here, a constant C designates the capacity of the storage battery 13, and a constant P designates the price of the storage battery 13. (P/C) is the price of the battery per unit capacity.

Unless only the storage battery 13 can be replaced in the structure, the constant P may include the price of the bidirectional inverter 12, costs of facilities, and the like.

In the cost function TC in (1), the differences between the price of electricity at charge and that at discharge are added to the time T by the first term within the curly brackets, and the deterioration prices of the battery at discharge are added to the time T by the second term. By minimizing the objective function (TC), the amount of electric power to be charged and discharged $\Delta s_t$ at each time of a day is determined such that the difference between the price of electricity at charge and that at discharge exceeds the deterioration cost of the storage battery 13 produced by discharge.

A variable $s_t$ ($0 \le s_t \le C$) designates the remaining capacity of the storage battery 13 at the time t ($=0, 1, \ldots, T$). Accordingly, the depth of discharge at the time t is expressed by $(1-s_t/C)$. The positive sign of the amount of electric power to be charged and discharged $\Delta s_t$ designates charge, and the negative sign designates discharge. Accordingly, in the relationship among the remaining capacity $s_t$ at the time t, the amount of electric power to be charged and discharged $\Delta s_t$ at the same time t, and the remaining capacity $s_{t+1}$ at the next time to the time t (t+1), the following expression is established. $s_0$ is the real remaining capacity at the current time (t=0).

[Math. 3]

$$s_{t+1} = s_t + \Delta s_t \quad (3)$$

A function $u(\cdot)$ is a unit step function defined by the followings. The function is introduced in order to write (1) in a simple manner. By the unit step function, the second term within the curly brackets of (1) becomes 0 at charge, and becomes effective at discharge.

[Math. 4]

$$u(x) = \begin{cases} 1 & (x \ge 0) \\ 0 & (x < 0) \end{cases} \quad (4)$$

Figure 4:
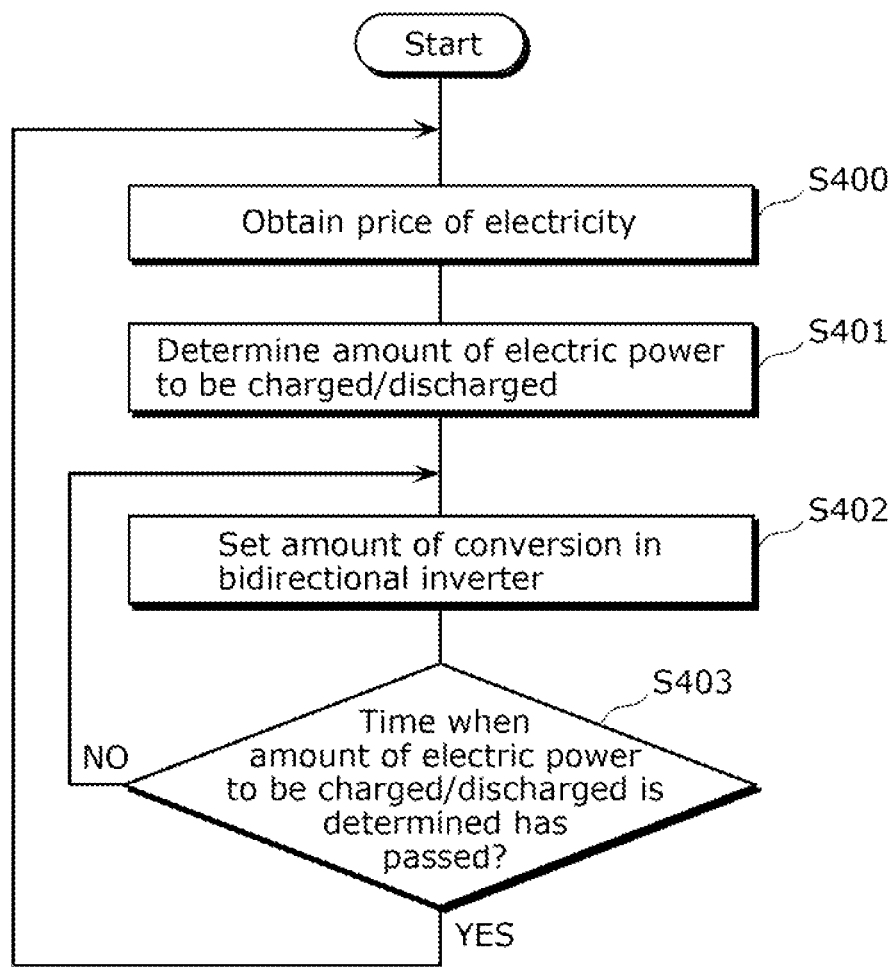
FIG. 4 is a schematic view showing a flow of processing of a controller in Embodiment 2.

FIG. 4 shows a flowchart of the controller 14 according to Embodiment 2.

First, the controller 14 according to Embodiment 2 obtains a value of the price of electricity $R(t)$ at each time t ($=0, \ldots, T-1$) from the electricity price server 21 (S400). Next, using (1), the controller 14 determines the amount of electric power to be charged and discharged $\Delta s_t$ at each time t ($=0, \ldots, T$) (S401).

For determination of the solution of the amount of electric power to be charged and discharged $\Delta s_t$ (t=0, \ldots, T-1) that minimizes the value of (1), mathematical programming such as dynamic programming, and typical heuristic methods (metaheuristic methods) such as genetic algorithm (GA) and simulated annealing (SA: simulated annealing) are suitably used.

Here, in the case where the amount of electric power to be charged and discharged $\Delta s_t$ is determined using the dynamic programming, Bellman's optimality principle is applied to (1), and for example, as in (5) below, at a time i ($1 \le i \le T$), (1)

is first transformed into a recurrence relation of the minimum cost V(s_i, i) wherein the amount of electric power to be stored is s_i.

[Math. 5]

$$V(s_i, i) = \min_{\Delta s_1, s_2, \ldots, \Delta s_{i-1}} \sum_{t=1}^{i-1} \{PC(\Delta s_t, t) + \frac{P}{C} \cdot \frac{N(1-s_t/C) - N(1-s_{t+1}/C)}{N(1-s_t/C)N(1-s_{t+1}/C)} \cdot u(-\Delta s_t)\}$$
$$= \min_{\Delta s_{i-1}} \left[ V(s_{i-1}, i-1) + PC(\Delta s_{i-1}, T) + \frac{P}{C} \cdot \frac{N(1-s_{i-1}/C) - N(1-s_i/C)}{N(1-s_{i-1}/C)N(1-s_i/C)} \cdot u(-\Delta s_i) \right]$$
(5)

Next, by discretizing the amount of electric power to be stored $s_t$, $V(s_T, T)$ is held in a sequence. In the sequence, a minimum cost path is searched by the same procedure as Viterbi algorithm to the Hidden Markov Model. Thereby, $\Delta s_1$, $\Delta s_2$, ..., and $\Delta s_{T-1}$ that give the minimum value of $V(s_T, T)$ are determined. Specifically, the costs are integrated in the forward direction of the time (i=1, 2, ..., T). $V(s_i, i)$ is determined for the discretized state $s_i$ and time i. Subsequently, the path using in calculation of $V(s_i, i)$ is traced back in the opposite direction from the time T. Thereby, the amount of electric power to be charged and discharged $\Delta s_i$ at each time of a day is confirmed.

Thus, the amount of electric power to be charged and discharged $\Delta s_t$ (t=0, 1, ..., T-1) at each time is determined. Subsequently, controller 14 controls the bidirectional inverter 12 such that the amount of electric power to be charged and discharged in the storage battery 13 within each time step is $\Delta s_t$ (S402). The processing of obtaining the price of electricity and determining the amount of electric power to be charged and discharged $\Delta s_t$ from the obtained price of electricity is performed only a certain time away (T-1). For this reason, the steps above are periodically repeated (S403). Moreover, in the case where the remaining capacity $s_t$ (t=1, ..., T) at each time when it is calculated in S401 is different from the real remaining capacity, the processing may be started from S400.

In the second term within the curly brackets of (1), in the case where the time step of calculating (1) is sufficiently small, considering the limit of $s_{t+1}$---> $s_t$, (1) may be transformed into the followings. N'(·) designates differentiation of the function N(·).

[Math. 6]

$$TC(\Delta s_0, \Delta s_1, \ldots, \Delta s_{T-1}) = \sum_{t=0}^{T-1} \left\{ PC(\Delta s_t, t) + \frac{P}{C} \cdot \frac{N'(1-s_t/C)}{N(1-s_t/C)^2} \cdot \Delta s_t \cdot u(-\Delta s_t) \right\}$$
(6)

A penalty according to the remaining capacity $s_t$ may be added to (1). For example, it is known that the lithium ion storage battery deteriorates if it is left in a state close to full charge. Moreover, in the case where the electric power storage system is installed with the solar power generation system or the like, full charge may be avoided in the electric power storage system in order to absorb excessive electric power unexpectedly produced. Here, the penalty function $Q(s_t)$ according to the remaining capacity $s_t$ is introduced into (1). Thereby, the cost function can be as follows.

[Math. 7]

$$TC(\Delta s_0, \Delta s_1, \ldots, \Delta s_{T-1}) = \sum_{t=0}^{T-1} \left\{ PC(\Delta s_t, t) + \frac{P}{C} \cdot \frac{N(1-s_t/C) - N(1-s_{t+1}/C)}{N(1-s_t/C)N(1-s_{t+1}/C)} \cdot u(-\Delta s_t) + Q(s_t) \right\}$$
(7)

As the parameters for the cost function TC(·) and PC(·), in addition to the amount of electric power to be charged and discharged $\Delta s_t$, other control parameter may be used. For example, in the case where the electric power storage system is installed with a cogeneration system, a generator, and heat source equipment using the electric power, the control parameters for these may be added to determine the optimal control parameters for these apparatuses in addition to the amount of electric power to be charged and discharged to at each time.

The operation below will be performed:

Namely, the first half portion of (1), i.e., $\Sigma PC(\Delta s_t, t)$ is expressed as F. $\Sigma PC(\Delta s_t, t)$="amount of the integrated price of the electric power to be bought at charge" about only t at $\Delta s_t > 0$ (at charge) is expressed as Fa. $\Sigma PC(\Delta s_t, t)$="amount of the integrated profit by discharge (amount of the profit)" about only t at $\Delta s_t < 0$ (at discharge) is expressed as Fb. The second half of (1), i.e., $\Sigma[P/C \cdot (\ldots)]$ is expressed as G.

For example, the discharge control unit described above may calculate the cost function value (TC, (1)) obtained by adding the electricity price (F) to the discharge cost (G). Moreover, the electricity price (F) added to the cost function value (TC) may be an amount obtained by adding the charge determined at the price at charge (Fa) and subtracting the charge determined at the price at discharge (Fb). From a group of the amounts of electric power to be charged and discharged including the amounts of electric power to be charged and discharged ($\Delta s_t$) at a plurality of times (t=0, 1, ..., T-1) (a combination of the amounts of electric power to be charged and discharged, "$\Delta s_0, \Delta s_1, \ldots, \Delta s_{T-1}$"), the cost function value (TC) in the group may be calculated. Among a plurality of the groups, according to a plurality of the amounts of electric power to be charged and discharged included in the group in which the cost function value (TC) to be calculated is the minimum ($\Delta s_0, \Delta s_1, \ldots, \Delta s_{T-1}$), charge and discharge of the amount of electric power to be charged and discharged ($\Delta s_t$) in the group at the time may be performed at each time (t).

More specifically, the cost function value (TC) to be calculated may be a cost function value (TC of (7)) to which the value of the penalty about leaving ($Q(s_t)$ of (7)) is further added, the value of the penalty being greater as the battery is left in a state close to full charge for a longer period of time (described above), in the group in which the cost function value is calculated. The range close to full charge may be a range (95%) obtained by subtracting a predetermined amount (for example, 5%) from 100%, for example.

[Embodiment 3]

Figure 5:
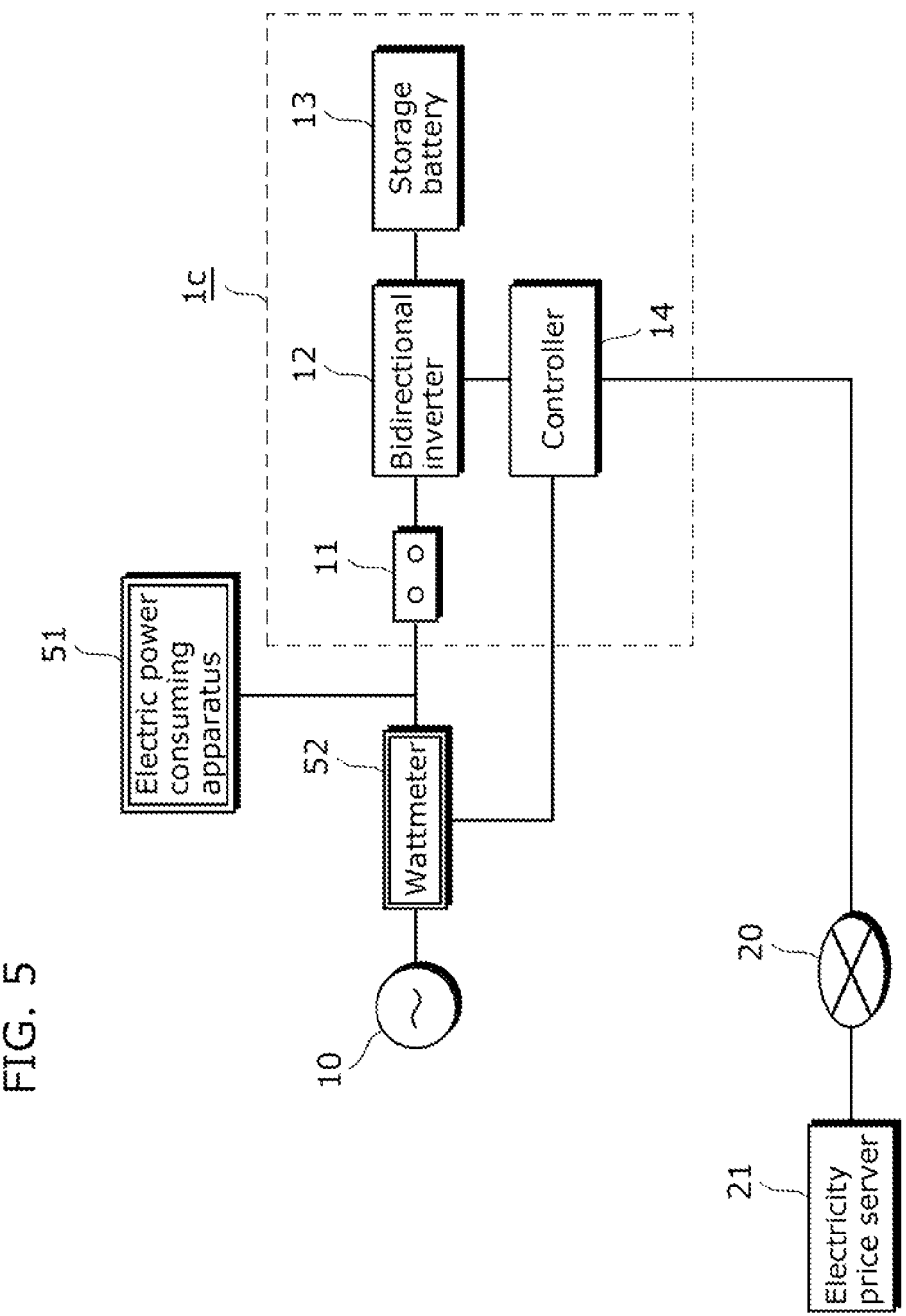
FIG. 5 is a schematic view of an electric power storage system according to Embodiment 3.

FIG. 5 is a block diagram of an electric power storage system is according to Embodiment 3.

In FIG. 5, same reference numerals will be given to same components as those in FIG. 1, and the description thereof will be properly omitted.

As shown in FIG. 5, in the case where the electric power storage system is installed with an electric power consuming apparatus 51 in a location of a user, if the electric power consuming apparatus 51 has a small demand for electric power, discharge by the electric power storage system may cause reverse power flow (selling) to the commercial power system 10. In this case, a wattmeter 52 is installed, and the controller 14 determines the amount of electric power to be charged and discharged $\Delta s_t$ such that the reverse power flow is not produced. Alternatively, considering the selling price at the time of the reverse power flow, the controller 14 may calculate the function $PC(\Delta s_t, t)$. In order to perform these, usually, prediction of the demand or the like is necessary.

The wattmeter 52 may be a part of the electric power storage system 1c, or may be provided outside of the electric power storage system 1c.

More specifically, the next operation may be performed.

For example, of the total amount of electric power to be discharged from the storage battery 13, a first proportion of the amount of electric power may be supplied to the electric power consuming apparatus (electric power consuming apparatus 51). The amount of electric power to be bought from the commercial power system 10 may be reduced by the amount of electric power to be supplied by the discharge. Additionally, the electricity may be sold back by the reverse power flow by a second proportion of the amount of electric power. The sum of the price obtained by multiplying the price of electricity of the commercial power system 10 by the first proportion and the price obtained by multiplying the selling price by the second proportion may be determined by the controller 14 as the price of the total amount of electric power to be discharged.

Here, in selling of the electricity, only the amount of electric power not more than the limit of the amount of electric power can be sold by setting by the electric power utility company or the like. Here, the group of the amounts of electric power to be charged and discharged ("$\Delta s_0, \Delta s_1, \ldots$") including the amounts of electric power to be charged and discharged at a plurality of times (t=0, 1, ...) is processed. At this time, about the amount of electric power to be charged and discharged wherein $\Delta s_0 < 0$, which is discharged, it may be determined whether the amount of electric power to be sold of the amount of electric power to be charged and discharged ($-\Delta s_t > 0$) exceeds such a limit. Only if it is determined that the group has the amount of electric power to be sold that does not exceed the limit, the group may be used.

[Embodiment 4]

Figure 6:
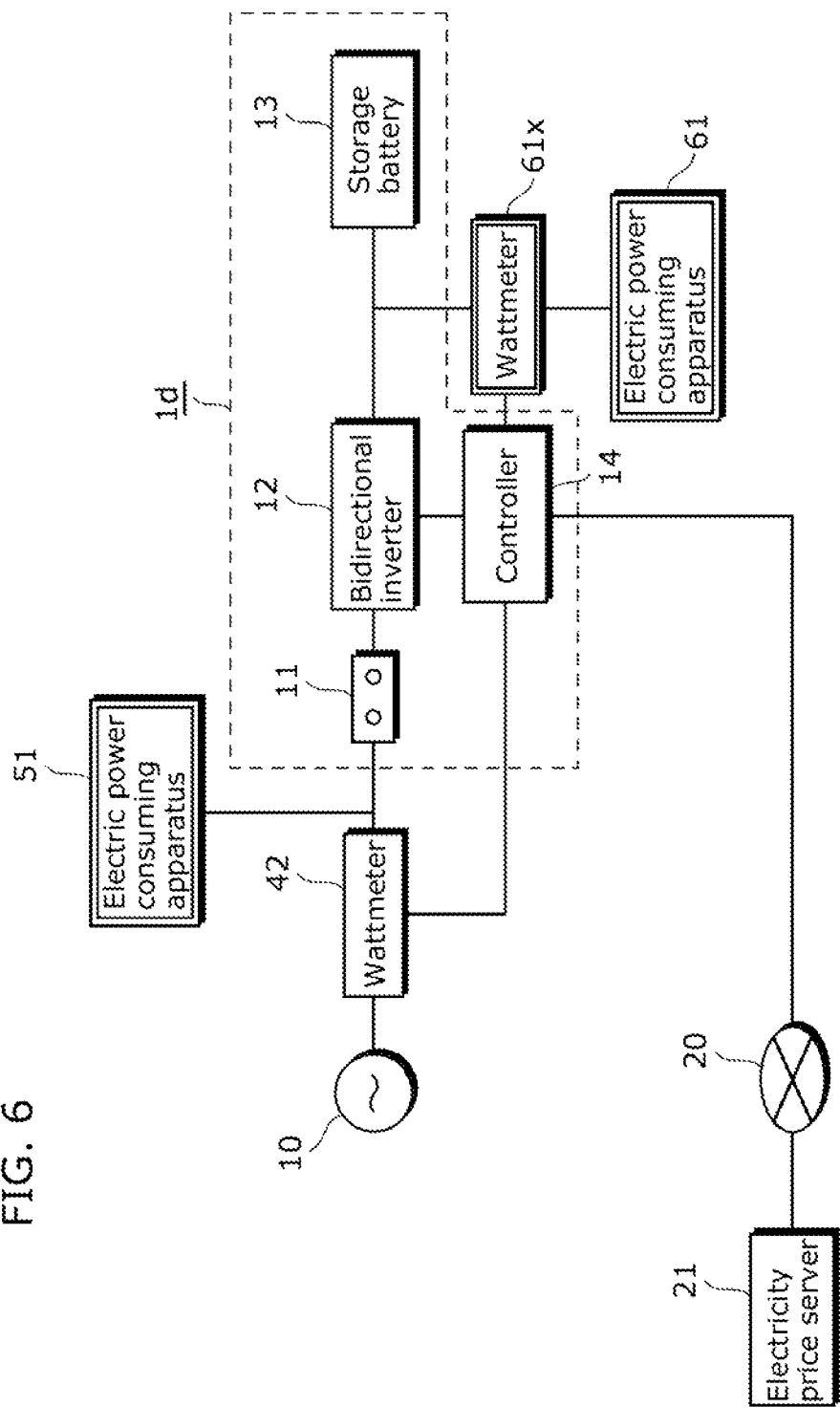
FIG. 6 is a schematic view of an electric power storage system according to Embodiment 4.
Figure 7:
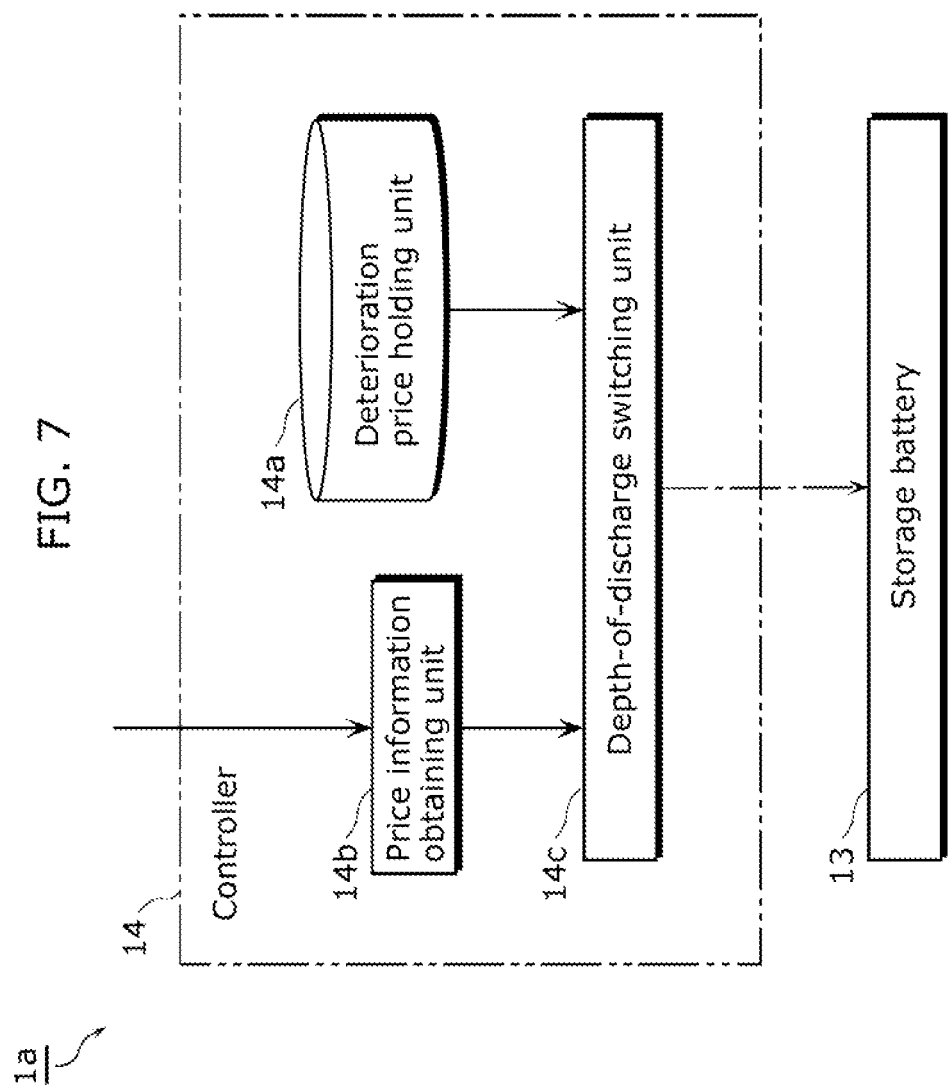
FIG. 7 is a drawing illustrating a configuration of a controller.
Figure 8:
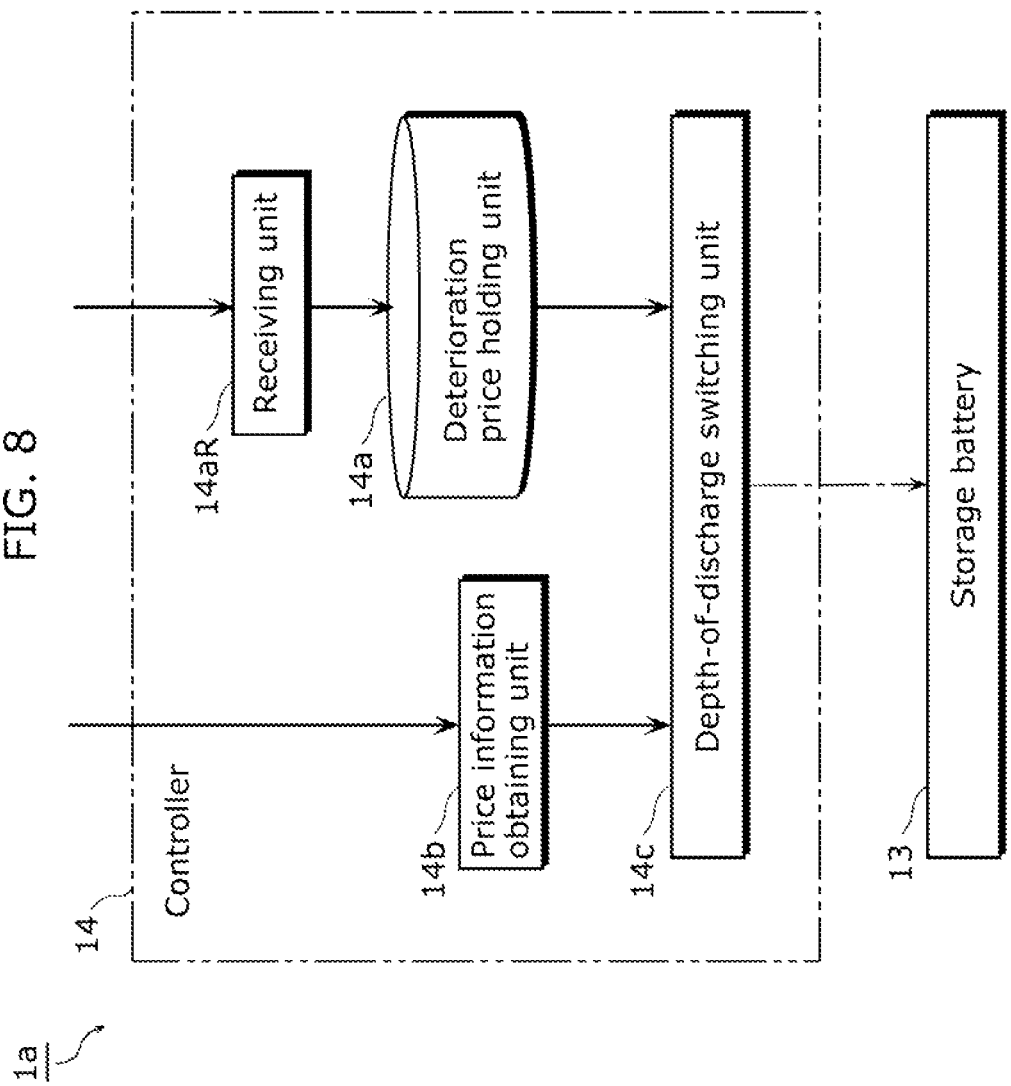
FIG. 8 is a drawing illustrating a configuration of a controller.

FIG. 6 is a block diagram of an electric power storage system id according to Embodiment 4.

In FIG. 6, same reference numerals will be given to same components as those in FIG. 1 and FIG. 5, and the description thereof will be properly omitted.

In FIG. 6, a direct current electric power consuming apparatus 61 and a wattmeter 61x are additionally installed. In this case, in an instruction from the controller 14 to the bidirectional inverter 12 about the amount of electric power to be converted, the electric power consumed by the direct current electric power consuming apparatus 61 is added. The electric power consumed by the direct current electric power consuming apparatus 61 is measured by the wattmeter 61x from the value of the amount of electric power to be charged and discharged $\Delta s_t$.

The direct current electric power consuming apparatus 61 may be an LED (Light Emitting Diode) light, for example. The electric power consuming apparatus 61 may be a personal computer or the like.

Thus, the electric power consuming apparatus to which the discharged electric power is supplied may be an alternating current electric power consuming apparatus 51 or a direct current electric power consuming apparatus 61. The discharged electric power may be supplied to both types of apparatuses.

The next operation may be performed.

Namely, the storage battery (for example, the storage battery 13, see Patent Document 1 and others) is usually deteriorated in charge and discharge (the storage battery is damaged), and the deterioration cost (loss by the discharge cost, deterioration price) such as 40 yen/kWh, 20 yen/kWh, and 10 yen/kWh in (b) of FIG. 3 is produced, for example.

Here, as described above, the produced deterioration cost may be relatively small (for example, 10 yen/kWh) in the case of the first depth of discharge having a shallow depth of discharge (for example, a depth of discharge of more than 40% to 60% (for example, a depth of discharge of 50%)). Conversely, the produced deterioration cost may be relatively large (for example, 20 yen/kWh) in the case of the second and deep depth of discharge (for example, at more than 60% to 80% (for example, 70%)). Here, the depth of discharge may be a proportion of the amount of electric power used in practice for charge and discharge relative to the amount of electric power to be stored at full charge, for example. Specific examples of the proportion include the proportion of more than 80% to 100% (for example, 90%), the proportion of more than 60% to 80% (for example, 70%), and the proportion of more than 40% to 60% (for example, 50%) in (b) of FIG. 3.

On the other hand, the storage battery (for example, the storage battery 13) is usually charged during the nighttime in which a lower price (for example, 8 yen/kWh) is set by the electric power utility company, and discharged during the daytime in which a higher price (for example, 27 yen/kWh) is set.

Thereby, a profit according to the difference in the price obtained by subtracting the price at charge from the price at discharge (for example, 27−8=19 yen/kWh) is produced by charge and discharge.

Here, the produced profit can be used to pay for the deterioration cost to be produced.

Recently, however, along with liberalization of the electricity market or the like, the price of electricity is set more freely and more variously by the electric power utility company or the like.

Besides, in the future, it is thought that the solar power generation will be widely spread, in which the amount of electric power to be generated is large on a sunny day, and is small in a rainy day. It is also thought that the wind power generation will be widely spread, in which the amount of electric power to be generated is large on a strong windy day, and is small on a mild windy day. Thus, it is thought that a power generation system in which the amount of electric power to be generated greatly changes depending on the day (time) of generation will be spread.

For this reason, in the future, it is presumed that by the electric power utility company or the like, as a daytime price, a lower price is set on a day such as a sunny day and a strong windy day in which the amount of electric power to be generated is large, and a higher price is set on a rainy day and a mild windy day. Namely, it is assumed that the price changes between the first difference in the price having a small difference between the price at discharge and that at charge and the second difference in the price having a large difference between the price at discharge and that at charge.

For example, about the daytime price, it is thought that a setting such that the difference in the price changes for a considerably short period of time is provided; for example, a lower price is set for 15 minutes when the sun shines strongly, and a higher price is set for the next 15 minutes when the sun shines weakly.

If the difference in the price changes in this way, the profit produced according to the difference in the price (describe above) also changes, namely, the amount of the profit used to pay for the deterioration cost changes.

If the deterioration cost is constant while the difference in the price changes, the amount of the profit used to pay for the deterioration cost changes, the deterioration cost to be produced becomes unbalanced to the profit to be produced, for example, the deterioration cost is excessively large or small to the amount of the profit used to pay therefor.

For this, in turn, for a period of the life of the storage battery until the amount of the integrated deterioration cost reaches the amount of the life of the storage battery and a new storage battery needs to be bought, the amount of the integrated profit obtained by integrating the profits produced by charge and discharge is out of a proper amount for the price of a newly bought storage battery or the like. Namely, the amount of the integrated profit at the end of the life becomes an improper amount.

Accordingly, in the controller (controller 14), for example, in the charge and discharge of the storage battery 13, in the case where the depth of discharge is a first depth of discharge (more than 40% to 60% (for example, 50%)) shallower than a second depth of discharge (for example, more than 60% to 80% (for example, 70%) in (b) of FIG. 3), a first deterioration cost (10 yen/kWh) smaller than a second deterioration cost (20 yen/kWh) may be produced. Moreover, in the charge and discharge, in the case of a second depth of discharge deeper than the first depth of discharge (more than 60% to 80%), the second deterioration cost greater than the first deterioration cost (20 yen/kWh) may be produced.

Here, specifically, the deterioration cost to be produced may be a deterioration cost assumed to be produced (or an approximate value thereof).

By the charge and discharge, the first profit (10 yen/kWh) smaller than the second profit (20 yen/kWh) may be produced in the case where the difference in the price between the price at discharge and the price at charge, which is obtained by subtracting the price at charge from the price at discharge, is the first difference in the price (the difference in the price of 10 yen/kWh) smaller than the second difference in the price (for example, the difference in the price of 20 yen/kWh), and the second profit (20 yen/kWh) may be produced in the case where the difference in the price between the price at discharge and that at charge is the second difference in the price greater than the first difference in the price (20 yen/kWh).

The obtaining unit (price information obtaining unit 14b, S81) may obtain the information indicating the difference between the price at discharge and that at charge when charge and discharge are performed (10 yen/kWh, or 20 yen/kWh).

In the case where the obtained difference in the price is the first and small difference in the price (10 yen/kWh) (S821: NO), the discharge control unit (depth-of-discharge switching unit 14c) may cause the storage battery to charge and discharge at the first and shallow depth of discharge at which the first and small deterioration cost is produced (more than 40% to 60% (for example, 50%)) (S822a). In the case where the obtained difference in the price is the second and large difference in the price (20 yen/kWh) (S821: YES), the discharge control unit (depth-of-discharge switching unit 14c) may cause the storage battery to charge and discharge at the second and deep depth of discharge at which the second and large deterioration cost is produced (more than 60% to 80% (for example, 70%)) (S822b).

Thereby, even if the difference in the price changes and the profit to be produced changes, a depth of discharge (first or second depth of discharge) well balanced to the difference in the price is used. For this, the amount of the deterioration cost to be produced can be well balanced to the difference in the price, and in turn, to the profit produced according to the difference in the price.

Thereby, for example, the amount of the integrated profit at the end of the life of the storage battery 13 can be a proper amount for the price needed to buy a new storage battery 13 or the like.

Specifically, the first and second depths of discharge both may be a relatively shallow depth of discharge such as a depth of discharge at which the deterioration cost to be produced is not more than a predetermined value, and the deterioration cost to be produced may be relatively small (see Patent Documents 2, 3, and 4).

Moreover, a time when the price is relatively low. (lowest) may be selected from a plurality of times. Moreover, a time when the price is relatively high (highest) may also be selected. Charge may be performed at the selected time when the price is low, and discharge may be performed at the selected time when the price is high (see S201, S203, and Patent Document 5). More specifically, the difference in the price from which the used depth of discharge is determined may be a difference between the prices at the thus selected times, for example, and such a difference between the prices at the selected times may change between the first difference in the price and the second difference in the price.

More specifically, the holding unit may hold the first and small deterioration cost (for example, 10 yen/kWh).

The first and small difference in the price may be the difference in the price (the difference in the price of not more than 10 yen/kWh) in which the profit produced at the first difference in the price is an amount not more than the held first deterioration cost.

The second and large difference in the price may be a difference in the price (difference in the price more than 10 yen/kWh such as 20 yen/kWh) in which the profit corresponding to the second difference in the price is an amount greater than the held first deterioration cost.

The price information obtaining unit 14b may obtain the difference in the price from the electricity price server 21 or the like, or may calculate the difference in the price from data other than the obtained difference in the price to obtain the difference in the price as a result of the calculation.

When the storage battery 13 before replacement is replaced by a new storage battery 13, the receiving unit 14aR may receive the data of the new storage battery 13 after replacement (for example, the first and small deterioration cost described above) from the outside of the controller 14 or the like, and the received data may be held and used.

Thus, in the system (electric power storage system 1a, or the like), a plurality of configurations such as the price information obtaining unit 14b and the depth-of-discharge switching unit 14c are combined, providing a synergistic effect by the combination. On the is other hand, in the related art, all or part of these configurations is missing, and no such a synergistic effect is provided. The system is different from that in the related art in this respect.

Moreover, a computer program for implementing the functions above may be constructed. A storage medium having the computer program stored may be constructed. An integrated circuit having the functions above mounted on may be constructed, or others may be constructed. Moreover, a method including the steps above may be constructed.

Alternatively, a plurality of elements described in a plurality of sections separated from each other such as a plurality of elements in a plurality of embodiments different from each other may be properly combined. In simple details, the embodiment above may be used, or other embodiments may be used. The other embodiments may be embodiments easy to conceive or embodiments difficult to conceive such as further modified embodiments, for example. Both belong to the scope of the present invention as long as the present invention is applied.

[Industrial Applicability]

The method for controlling an electric power storage system according to the embodiment includes control of charge and discharge in consideration of deterioration of the battery and the price of electricity, and is particularly useful as a method for controlling an electric power storage system in which the battery module can be replaced.

[Reference Signs List]

| | |
|---|---|
| 10 | Commercial power system |
| 11 | Connection unit |
| 12 | Bidirectional inverter |
| 13 | Secondary battery |
| 14 | Controller |
| 14a | Deterioration price holding unit |
| 14b | Price information obtaining unit |
| 14c | Depth-of-discharge switching unit |
| 20 | Communication system (communication network) |
| 21 | Electricity price server |
| 51 | Electric power consuming apparatus |
| 52 | Wattmeter |
| 61 | electric power consuming apparatus |
| 61x | Direct current wattmeter |

The invention claimed is:

1. A controller, comprising:
a non-transitory memory;
a holding unit configured to hold, using the non-transitory memory, discharge costs at depths of discharge in association with the depths of discharge at which a storage battery is charged and discharged;
an obtaining unit configured to obtain a price of electricity at discharge and a price of electricity at charge; and
a discharge control unit configured to cause the storage battery to discharge at a depth of discharge at which the discharge cost held in association with the depth of discharge does not exceed a difference in the price between the obtained price at discharge and the obtained price at charge, the difference in the price being obtained by subtracting the obtained price at charge from the obtained price at discharge.

2. The controller according to claim 1,
wherein the controller is provided in an electric power storage system comprising:
the storage battery; and
a bidirectional inverter connected to a commercial power system in which a price of electricity dynamically changes, and to the storage battery, and
wherein the discharge cost held by said holding unit is a cost calculated from the depth of discharge corresponding to the discharge cost, the cycle life properties of the storage battery, and a price of the storage battery.

3. The controller according to claim 1,
wherein said obtaining unit is configured to obtain a selling price of electric power when at discharge, the electric power to be discharged is sold back by reverse power flow.

4. The controller according to claim 1,
wherein the held discharge cost is a discharge cost per unit amount of electric power, and
wherein the price at charge and price at discharge obtained by said obtaining unit are a price per unit amount of electric power.

5. The controller according to claim 1, further comprising a receiving unit configured to receive the discharge cost,
wherein said holding unit is configured to hold the received discharge cost in association with the depth of discharge corresponding to the discharge cost.

6. The controller according to claim 1,
wherein the price at charge obtained by said obtaining unit is a price when discharged electric power is re-charged at a time after the electric power is discharged.

7. The controller according to claim 1,
wherein said discharge control unit is configured to calculate a cost function value obtained by adding an electricity price to a discharge cost,
wherein the electricity price added to the cost function value is a price obtained by adding an electricity price determined at the price at charge and subtracting an electricity price determined at the price at discharge,
wherein said discharge control unit is configured to calculate the cost function value in a group of the amounts of electric power to be charged and discharged including the amounts of electric power to be charged and discharged at a plurality of times from the group, and
wherein said discharge control unit is configured to cause the storage battery to charge and discharge by an amount of electric power to be charged and discharged at a time in a group at each of the times according to a plurality of the amounts of electric power to be charged and discharged, which are included in the group having a minimum calculated cost function value among a plurality of the groups.

8. The controller according to claim 7,
wherein the calculated cost function value is a cost function value to which a value of a penalty about leaving is further added, the value of the penalty being larger as the battery is left in a state close to full charge for a longer period of time, in the group in which the cost function value is calculated.

9. The controller according to claim 1,
wherein the storage battery is charged and discharged such that
a first deterioration cost smaller than a second deterioration cost is produced in the case where a depth of discharge is a first depth of discharge shallower than a second depth of discharge, and a second deterioration cost greater than the first deterioration cost is produced in the case where the depth of discharge is the second depth of discharge deeper than the first depth of discharge, and
a first profit smaller than a second profit is produced in the case where the difference in the price between the price at discharge and the price at charge, which is obtained by subtracting the price at charge from the price at discharge is a first difference in the price smaller than a second difference in the price, and the second profit greater than the first profit is produced in the case where the difference in the price is the second difference in the price greater than the first difference in the price,
wherein said obtaining unit is configured to obtain the difference in the price between the price at discharge and the price at charge when charge and discharge are performed, and
wherein said discharge control unit is configured to cause the storage battery to charge and discharge at the first and shallow depth of discharge in the case where the obtained difference in the price is the first and small the difference in the price, and to cause the storage battery to charge and discharge at the second and deep depth of discharge in the case where the obtained difference in the price is the second and large difference in the price.

10. The controller according to claim 9,
wherein said holding unit is configured to hold the first and small deterioration cost,
wherein the first and small difference in the price is a difference in the price in which the profit produced at the first difference in the price is an amount not more than the held first deterioration cost, and
wherein the second and large difference in the price is a difference in the price in which the profit produced according to the second difference in the price is an amount greater than the held first deterioration cost.

11. An electric power storage system, comprising:
a storage battery configured to be charged and discharged;
a holding unit configured to hold discharge costs at depths of discharge in association with the depths of discharge of the storage battery;
an obtaining unit configured to obtain a price of electricity at discharge and a price of electricity at charge; and
a discharge control unit configured to cause the storage battery to discharge at a depth of discharge at which the discharge cost held in association with the depth of discharge does not exceed a difference in the price of the obtained price at discharge and the obtained price at charge, which is obtained by subtracting the obtained price at charge from the obtained price at discharge.

12. A control method, comprising:
holding, using m discharge costs at depths of discharge in association with the depths of discharge at which a storage battery is charged and discharged;
obtaining a price of electricity at discharge and a price of electricity at charge; and
controlling to cause the storage battery to discharge at a depth of discharge at which the discharge cost held in association with the depth of discharge does not exceed a difference in the price between the obtained price at discharge and the obtained price at charge, the difference in the price being obtained by subtracting the obtained price at charge from the obtained price at discharge.

13. A computer program recorded on a non-transitory computer-readable recording medium for use in a computer, said program causing the computer to execute:
holding discharge costs at depths of discharge in association with the depths of discharge at which a storage battery is charged and discharged;
obtaining a price of electricity at discharge and a price of electricity at charge; and
controlling to cause the storage battery to discharge at a depth of discharge at which the discharge cost held in association with the depth of discharge does not exceed a difference in the price between the obtained price at discharge and the obtained price at charge, the difference in the price being obtained by subtracting the obtained price at charge from the obtained price at discharge.

* * * * *